July 23, 1946.    S. BLOOMFIELD    2,404,427
EXPANSIBLE JAW SCREW DRIVER
Filed Feb. 23, 1944
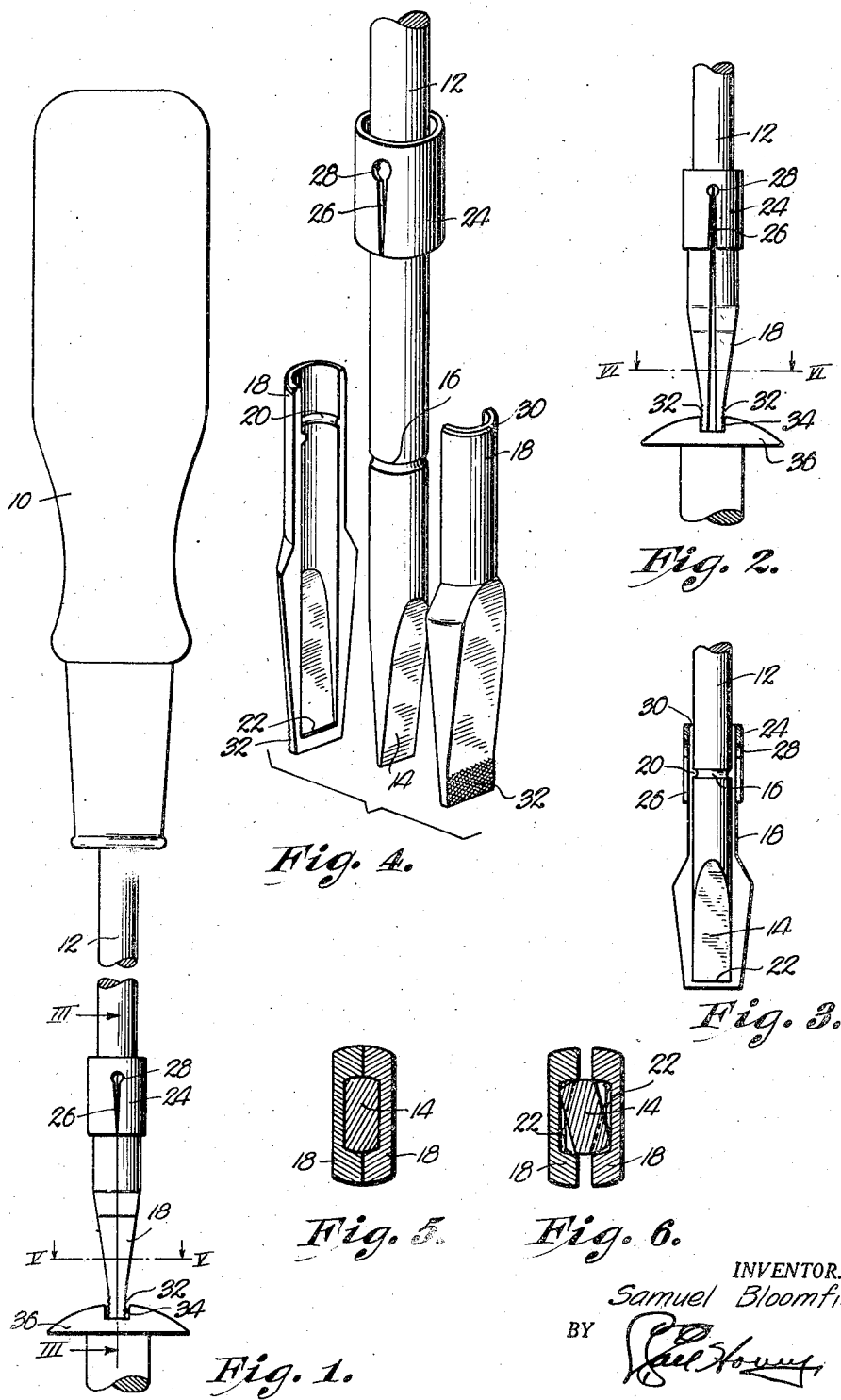
INVENTOR.
Samuel Bloomfield
BY
ATTORNEY.

Patented July 23, 1946

2,404,427

UNITED STATES PATENT OFFICE 2,404,427

EXPANSIBLE JAW SCREW DRIVER

Samuel Bloomfield, Wichita, Kans.

Application February 23, 1944, Serial No. 523,519

3 Claims. (Cl. 145—50)

This invention relates to hand tools of the type employed in moving to and from position, conventional kerfed screws, bolts, machine screws and the like, the primary object being the provision of such an instrument having as a part thereof, simple, rugged, inexpensive, unique and efficient means for gripping the longitudinal side walls of the kerf to preclude accidental disengagement.

One of the important aims of the present invention is the provision of a hand tool of the aforementioned character that is in the nature of a screw driver having as a part thereof, resilient jaws, movable to engagement with the edges of a screw kerf as torque is applied to the screw driver shank in either direction about its longitudinal axis.

Another object of this invention is to provide an inexpensive hand tool for manipulating screws, that embodies an assembly of interrelated parts at the blade end of the tool, which assembly is shifted to and from a normal position through the interaction of the manual manipulation of the tool and the means for yieldably engaging the said parts.

Other objects of the invention include the specific manner of constructing the screw driver shank, the jaws associated therewith, and the means for yieldably holding the jaws in a normal position, all of which will appear during the course of the following specification, referring to the accompanying drawing wherein:

Fig. 1 is a condensed side elevational view of an expansible jaw screw driver, made to embody the features of the present invention.

Fig. 2 is a fragmentary side elevational view of a portion of the tool showing the jaws thereof in an expanded condition.

Fig. 3 is a fragmentary vertical sectional view through that portion of the tool shown in Fig. 2 but taken on line III—III of Fig. 1.

Fig. 4 is an enlarged stretch-out perspective view of the component parts of the screw driver.

Fig. 5 is an enlarged cross sectional view taken on line V—V of Fig. 1; and

Fig. 6 is a similar cross sectional view taken on line VI—VI of Fig. 2.

One of the greatest problems experienced by users of screw drivers or similar tools that are employed in manipulating kerfed structural hardware, is the tendency of the screw driver blade to slip from the kerf as force is exerted about the longitudinal axis of the shank of the tool. This problem has been prevalent for a considerable period of time and much effort has been expended in solving this aim.

The expansible jaw screw driver illustrated herewith and about to be described, has been found to be efficient, inexpensive to construct, and easy to manipulate.

The conventional screw driver about which parts of the tool embodying the invention may be assembled, comprises the well-known handle 10, from which extends a shank 12. In this instance, the shank is attenuated, cylindrical member, uniform in diameter throughout its length and with planar inclined, diametrically opposite faces 14 forming the blade portion of the tool. An annular groove 16 formed in shank 12 is spaced inwardly from faces 14, as illustrated in Figs. 3 and 4.

The plurality of jaws that are loosely fitted upon shank 12, is, in this instance, a pair of semi-cylindrical jaws 18 each having an internal contour conforming to that of the blade portion of shank 12 against which they are assembled. A bead 20 is formed within each jaw 18 to enter groove 16.

When beads 20 of the two jaws 18 are in the aforementioned relation with respect to groove 16, the end of the blade formed by the convergence of faces 14, rests immediately above internal shoulders 22 formed on the jaws. When jaws 18 are so positioned with respect to each other and the blade of shank 12, the specially formed split collar 24 is positioned as illustrated in Fig. 1. This split collar is a resilient annulus having at least two slits 26 provided therein that extend inwardly from that edge of collar 24 adjacent to the free end of shank 12.

The slits are designed as illustrated in Fig. 4 and when in the normal position, these slits progressively increase in width as their inner end is approached. These slits terminate in an enlargement 28, all to the end that the split collar 24 may yieldably yet effectively hold the jaws 18 in a normal position but allow the expansion of the jaws, as hereinafter set down.

The outer edge of jaws 18 formed by the meeting of the outer side surfaces thereof and the edge surface at their upper ends, is beveled as at 30 to facilitate the placement of split collar 24 when the latter is moved downwardly over jaws 18. The frictional engagement between split collar 24 and jaws 18 will maintain these elements in a desirable working relation and against relative displacement. Well-known means may be utilized to secure collar 24 against longitudinal movement, if desired.

Each jaw 18 is specially formed at its kerf engaging edge. A relatively short planar and knurled area 32 is ground, cast or otherwise formed to insure a positive grip between the opposed faces 34 of the kerf of screw 36. These areas 32 are in parallelism with faces 34 of the screw kerf and when the tool is manipulated in a normal fashion, these knurled areas 32 will be forced against faces 34.

The operation of the hand tool is obvious from the foregoing specification but it should be stressed that advantages arise from the interengagement between internal shoulders 22 and the end of shank 12 formed by the meeting of faces 14. When a torque is applied to cause the shank to move about its longitudinal axis, surfaces 14 will act in a manner graphically illustrated in Fig. 6, i. e. jaws 18 will be forced from the normal position shown in Fig. 5 to the condition shown in Fig. 6, where knurled areas 32 are snugly and firmly pressed against the faces 34 of the kerf. Increasing the force of the torque will amplify the outward pressure exerted between jaws 18 and they will be more rigidly directed against the opposed surfaces 34 to positively preclude accidental displacement. The application of such torque is sufficient to overcome the tension of split collar 24 and when the tool is in operation the condition of jaws 18 and split collar 24 is as illustrated in Fig. 2. Release of the torque applying force will permit collar 24 to return jaws 18 to the normal position and the tool may be removed from engagement with the screw kerf the same as though the gripping jaws were not present.

The use of the unique expandible jaws does not add to the bulk of the tool to such an extent as to render its use objectionable, and since the overall thickness of the screw engaging ends of jaws 18 need not be greater than that of conventional screw drivers, the tool is usable wherever a standard screw driver could be employed.

Any tendency of the operator to exert downward pressure on shank 12 will not establish a maladjustment between the parts. The end of shank 12 will always rest upon shoulders 22 whether the jaws are in the normal position or spread in work.

The preferred embodiment of the invention has been illustrated and such modifications and alteration in specific structure as are within the spirit of the invention may be made without departing from the scope of the appended claims.

Having thus described the invention, what is claimed as new and desired to be secured by Letters Patent is:

1. A screw driver of the character described comprising, in combination, a handled shank having a blade; a plurality of jaws loosely fitted onto the blade and extending longitudinally therealong; means on each jaw respectively, to prevent accidental longitudinal displacement of the jaws; and resilient means engaging the jaws adapted to allow radial movement of the jaws as torque is applied to the blade, said jaws each having a shoulder engageable by the end of the blade as longitudinal force in one direction is applied to the shank during use of the screw driver.

2. A screw driver of the character described comprising, in combination, a handled shank having a blade at one end thereof and an annular groove formed therein adjacent to the blade; a plurality of jaws loosely fitted onto the blade and extending longitudinally therealong over the said groove; an internal bead on each jaw respectively, fitted into the groove to prevent longitudinal displacement of the jaws; and resilient means engaging the jaws adapted to allow radial movement of the jaws as torque is applied to the blade, each of said jaws having a shoulder formed on the inner face thereof engageable by the end of the blade when longitudinal force in one direction is exerted on the screw driver during use thereof.

3. A screw driver of the character described comprising, in combination, a handled, attenuated, cylindrical shank having a pair of planar diametrically opposed, inclined faces formed thereon at one end thereof; an annular groove formed in the shank spaced inwardly from the said inclined faces; a pair of opposed jaws each having a cavity formed therein contoured to snugly fit a length of the shank on each side of the groove; a bead on each jaw fitted into the groove; a shoulder on each jaw to engage the end of the shank at the said inclined faces; and resilient means circumscribing the jaws to hold the same in place on the shank, the side edges of the planar faces on the shank serving to spread the jaws as torque is applied thereto during operation of the screw driver, the end of said shank and the shoulders on the inner faces of the jaws being in engagement to cooperate with the inter-fitted groove and beads to prevent relative longitudinal movement of the shank and the jaws when longitudinal force in one direction is exerted on the shank.

SAMUEL BLOOMFIELD.